(12) United States Patent
Donovan et al.

(10) Patent No.: US 6,615,236 B2
(45) Date of Patent: *Sep. 2, 2003

(54) SIP-BASED FEATURE CONTROL

(75) Inventors: Steven R. Donovan, Plano, TX (US); Raghavan Devanathan, Plano, TX (US)

(73) Assignee: WorldCom, Inc., Clinton, MS (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/436,793

(22) Filed: Nov. 8, 1999

(65) Prior Publication Data

US 2002/0129093 A1 Sep. 12, 2002

(51) Int. Cl.[7] .............................................. G06F 15/16
(52) U.S. Cl. ..................... 709/203; 709/227; 709/230
(58) Field of Search ................................ 709/203, 227, 709/230

(56) References Cited

U.S. PATENT DOCUMENTS

| | | |
|---|---|---|
| 5,303,286 A | 4/1994 | Wiedeman |
| 5,434,907 A | 7/1995 | Hurst et al. |
| 5,634,012 A | 5/1997 | Logston et al. |
| 5,664,009 A | 9/1997 | Hurst et al. |
| 5,680,116 A | 10/1997 | Hashimoto et al. |
| 5,699,359 A * | 12/1997 | Suga .......................... 709/250 |
| 5,732,219 A | 3/1998 | Blumer et al. |
| 5,742,763 A | 4/1998 | Jones |
| 5,745,556 A | 4/1998 | Ronen |
| 5,794,039 A | 8/1998 | Guck |
| 5,802,510 A | 9/1998 | Jones |
| 5,826,039 A | 10/1998 | Jones |
| 5,832,221 A | 11/1998 | Jones |
| 5,859,898 A | 1/1999 | Checco |
| 5,864,610 A | 1/1999 | Ronen |
| 5,867,494 A | 2/1999 | Krishnaswamy et al. |
| 5,867,495 A | 2/1999 | Elliott et al. |
| 5,889,774 A | 3/1999 | Mirashrafi et al. |
| 5,907,547 A | 5/1999 | Foladate et al. |
| 5,923,659 A | 7/1999 | Curry et al. |
| 5,930,348 A | 7/1999 | Légnier et al. |
| 5,951,638 A | 9/1999 | Hoss et al. |

(List continued on next page.)

FOREIGN PATENT DOCUMENTS

| | | |
|---|---|---|
| EP | 0123456 | 1/2000 |
| WO | 97/16007 | 5/1997 |
| WO | 97/22210 | 6/1997 |
| WO | WO 97/22209 | 2/1999 |

OTHER PUBLICATIONS

Rosenberg et al., "Internet Telephony Gateway Location", 1998 IEEE, pp. 488–496.

Schulzrinne, et al., "Signaling for Internet Telephony", IEEE, Sep. 1998, pp. 298–307.

Schulzrinne, H., "A Comprehensive Multimedia Control Architecture for the Internet", IEEE, 1997, pp. 65–76.

Handley et al., "SIP: Session Initiation Protocol", Network Working Group, Request for Comments 2543, Mar. 1999, pp. 1–104.

Camarillo et al., "The SDP Fid Attribute", Internet Engineering Task Force, Internet Draft, Apr. 2001, pp. 1–4.

Rosenberg, "SIP: Past, Present and Future", www.dynamicsoft.com, May 10, 2000.

(List continued on next page.)

Primary Examiner—David Y. Eng

(57) ABSTRACT

A system and method for providing an addition to the Session Initiation Protocol is disclosed. The addition is a new field header, preferably entitled "Feature", that is added to the REGISTER message. This field would contain control information for various feature services, like the Do Not Disturb feature and other services provided by traditional PBX systems.

19 Claims, 2 Drawing Sheets

U.S. PATENT DOCUMENTS

| | | | |
|---|---|---|---|
| 5,953,504 | A | 9/1999 | Sokal et al. |
| 5,956,391 | A | 9/1999 | Melen et al. |
| 5,958,005 | A | 9/1999 | Thorne et al. |
| 5,960,416 | A | 9/1999 | Block |
| 5,999,525 | A | 12/1999 | Krishnaswamy et al. |
| 6,064,653 | A | 5/2000 | Farris |
| 6,069,890 | A | 5/2000 | White et al. |
| 6,073,160 | A | 6/2000 | Grantham et al. |
| 6,078,583 | A | 6/2000 | Takahara et al. |
| 6,081,518 | A | 6/2000 | Bowman-Amuah |
| 6,084,952 | A | 7/2000 | Beerman, Jr. et al. |
| 6,094,525 | A * | 7/2000 | Perlman et al. ............. 709/245 |
| 6,118,864 | A | 9/2000 | Chang et al. |
| 6,137,869 | A | 10/2000 | Voit et al. |
| 6,144,667 | A | 11/2000 | Doshi et al. |
| 6,147,975 | A | 11/2000 | Bowman-Amuah |
| 6,151,390 | A | 11/2000 | Volftsun et al. |
| 6,151,629 | A | 11/2000 | Trewitt |
| 6,157,648 | A | 12/2000 | Voit et al. |
| 6,161,008 | A | 12/2000 | Lee et al. |
| 6,167,042 | A | 12/2000 | Garland et al. |
| 6,178,181 | B1 | 1/2001 | Gritho |
| 6,188,760 | B1 | 2/2001 | Oran et al. |
| 6,195,697 | B1 | 2/2001 | Bowman-Amuah |
| 6,201,858 | B1 | 3/2001 | Sundhar |
| 6,202,081 | B1 * | 3/2001 | Naudus ...................... 709/200 |
| 6,215,858 | B1 | 4/2001 | Bartholomew et al. |
| 6,226,289 | B1 | 5/2001 | Williams et al. |
| 6,233,318 | B1 | 5/2001 | Picard et al. |
| 6,240,391 | B1 | 5/2001 | Ball et al. |
| 6,253,249 | B1 | 6/2001 | Belzile |
| 6,282,270 | B1 | 8/2001 | Porter |
| 6,292,479 | B1 | 9/2001 | Bartholomew et al. |
| 6,301,609 | B1 | 10/2001 | Aravamudan et al. |
| 6,333,931 | B1 | 12/2001 | LaPier et al. |
| 6,335,927 | B1 * | 1/2002 | Elliott et al. ................ 370/352 |
| 6,335,968 | B1 | 1/2002 | Malik |
| 6,411,705 | B2 | 6/2002 | Oran et al. |
| 6,453,034 | B1 | 9/2002 | Donovan et al. |

OTHER PUBLICATIONS

Cable Television Laboratories, Inc., "PacketCable CMS to CMS Signaling Specification", Nov. 28, 2000.

Marshall et al., "SIP Proxy–to–Proxy Extensions for Supporting DCS" SIP Working Group Internet Draft, Nov. 2000, pp. 1–24.

Woods, D., "Translating Menus at the VOIP Café", www.networkcomputing.com/1026/1026wsl.html, Dec. 27, 1999, pp. 1–4.

Cisco Systems, Inc., "Architecture for Voice", Video and Integrated Data, 2000, pp. 1–23.

Schulzrinne, H., "The Session Initiation Protocol (SIP)", www.cs.columbia.edu/~hgs, Sep. 28, 2000.

Schulzrinne, H., Internet Telephony and Multimedia, Status and Directions, Aug. 7, 2000.

Wedlund et al., "Mobility Support Using SIP", ACM 1999, pp. 76–82.

Schulzrinne et al., "The Session Initiation Protocol: Internet–Centric Signalling", IEEE Communications Magazine, Oct. 2000, pp 134–141.

Dalgic et al., "True Number Portability and Advanced Call Screening in a SIP–Based IP Telephony System", IEEE Communications Magazine, Jul. 1999, pp. 96–101.

Zimmerer, Eric, "SIP+(Inter MGC Protocol); Edition 0.0", Level 3 Communications, Dec. 4, 1998, paragraph 0002, 02.1, 02.4 and Figure 4, <URL: www.cs.columbia.edu/sip/drafts/SIP+01.doc>.

Donovan, S., "The SIP Info Method", Internet Engineering Task Force, Feb. 8, 1999, the whole document.

Sijben, P. et al., "Toward the PSTN/Internet Inter–Networking; Media Device Control Protocol", Internet Engineering Task Force, Version .03, Feb. 9, 1999, paragraph 10.1 and 11.4.

Schulzrinne et al., "RTP Payload for DTMF Digits, Telephony Tones and Telephony Signals", Internet Engineering Task Force, Jun. 9, 1999, paragraph 0001, <URL: www.openphone.org/docs/dtmf/tones.pdf.>

Schulzrinne, H. et al., "Signaling for Internet Telephony", IEEE, Oct. 13, 1998, pp. 298–307.

* cited by examiner

SIP-BASED FEATURE CONTROL

BACKGROUND OF THE INVENTION

1. Field of the Invention

The present invention relates generally to the field of Internet multimedia and single media communication, and, more particularly, to a method and system for providing feature-based services using the Session Initiation Protocol.

2. Description of the Related Art

The last twenty years have seen the Internet grow exponentially. From a tool for the technically savvy, the Internet has turned into one of the main communication means of a large segment of the general populace. As it has grown, other tools and technology, such as music and videos, have migrated to the computer-based medium.

One example of migrating technology is the movement of telephony services to the Internet. Internet telephony refers to a wide range of services, not merely the traditional telephone call. In general, it refers to the transport of real-time media, such as voice and video, over the Internet to provide interactive communication among Internet users. Users may access the Internet through a variety of means—a personal computer (PC), a stand-alone Internet Protocol (IP)-enabled device, or even by dialing up to a gateway from the handset of a traditional Public Switched Telephone Network (PSTN).

The advantages of IP telephony are quite sweeping. It offers high-quality voice communication, improved multiplexing gains, rich computer telephony integration, advanced services, an open market for providers, and reduced cost. Most of these advantages flow from the fact that IP telephony is packet-based, rather than circuit-based, like the present phone system. In a circuit-based communication, such as a phone call on traditional equipment, an actual connection is maintained between the caller and callee through switches and wires. In a packet-based communication, the communication itself is broken down into packets which are sent over a network. This allows for a more efficient use of resources. In addition, IP telephony uses mostly text-based protocols, which allows for easy implementation and debugging in languages such as Java, Tcl, and Perl. The layered protocols in IP telephony are also designed to operate independently of one another. This means that one can use the same higher-layer protocol in a wide range of devices, from cell and desktop telephones to TVs, stereos, and computers, because the lower, physical layers will take care of the differences.

Currently, traditional PSTN telephony uses SS7 (System Signalling 7) as the signalling protocol which establishes, controls, and tears down circuit connections. IP telephony uses SIP (Session Initiation Protocol, RFC 2543) as the signalling protocol for telephony, videoconferencing, and multimedia sessions. SIP provides for establishing and releasing connections.

The SIP protocol is a text-based protocol that works above the transport layer in the TCP/IP (Transport Control Protocol/Internet Protocol) stack. SIP can use any transport protocol, including TCP (Transport Control Protocol) and UDP (User Datagram Protocol) as its transport protocol. In addition, SIP can also work with ATM AAL5 (Asynchronous Transfer Mode ATM Adaption Layer 5), IPX (Internet Packet eXchange), frame relay or X.25 transport protocols.

There are two components in a SIP network: network servers and user agents. A user agent is an end system that acts on behalf of someone who wants to participate in calls. In general, the user agent contains both a protocol client (a user agent client UAC) which initiates a call and a protocol server (user agent server UAS) which responds to a call (see FIG. 1). There are two different types of network servers as well: a proxy server, which receives requests, determines which server to send it to, and then forwards the request; and a redirect server, which receives requests, but instead of forwarding them to the next hop server, tells the client to contact the next hop directly.

The steps in initiating a session are fairly simple: as shown in FIG. 1, (1) the UAC sends an INVITE request to a SIP server, which in this case, is a proxy server. The SIP server will look in its database to determine where to send the INVITE request. Once that is determined, the proxy server sends the INVITE message to the appropriate next hop. In FIG. 1, the next hop is the callee, but, in reality, there could be a number of hops between the SIP server and the callee. If the SIP server was a redirect server, it would inform the UAC what the appropriate next hop is, and let the UAC do the rest. Once (2) the INVITE message finally reaches the callee UAS, (3) the callee UAS responds with an OK message, which (4) is forwarded to the caller UAC. When the caller UAC receives the OK message, indicating the callee has received the INVITE, (5) the UAC sends an ACK message, which, when (6) received, will start the session.

However, there are difficulties in migrating all the current services of traditional telephone networks to Internet telephony and SIP. In traditional networks, the Private Branch Exchange (PBX) is the cornerstone of business voice communication networking. For instance, all the employees at a business will have phones at their desk connected to a PBX, which routes the calls, handles voice mail, and offers other services. The replacement of traditional PBXs with IP-(Internet Protocol)—based PBXs will require that the users have the same services from their IP-enabled desktop telephone that they previously had from their traditional PBX telephone.

An example of the type of services traditional PBXs offer is the Do Not Disturb feature. Do Not Disturb (DND) is often implemented as a button that a user presses so that all calls will be automatically forwarded to the user's voice mailbox. In a traditional PBX, a DND command message is generally sent from the desktop device to the PBX, which then automatically forwards all calls to the voice mail system. But, in an SIP-based IP telephone network, the desktop telephone, or, more exactly, the user agent server UAS, would perform the forwarding. Although this works in many cases, it assumes the end client device (in this case, the SIP-based IP desktop telephone) has a DND capability, which is not assured. Therefore, there is a need for a system and method for traditional PBX services, such as the DND feature, in end client devices, such as SIP-based IP desktop telephones, without assuming the end client devices have this capability.

In addition, there are other features in traditional PBX systems that require the network server to be notified of status changes, especially when those changes effect the session/call setup handling for a user that has signed up for a network-based service. Examples include unconditional call forwarding, when the user wishes to forward all calls to another number/address; conditional call forwarding, when the user wishes to forward some calls under certain conditions; call blocking, when the user wishes to block certain addresses/numbers from being called; and call screening, when the user wishes to prevent calls from certain address/numbers from being received. Therefore, a need exists for a method and system for the user agent to notify the network server of feature status changes, such as DND, call forwarding, screening and blocking.

SUMMARY OF THE INVENTION

An object of the present invention is to provide a system and method which allows the network server in a SIP-based telephony network to perform all the functions of a traditional PBX system.

Another object of the present invention is to allow traditional PBX functions to be performed in a network, without requiring that the end client devices in that network be able to perform all of these functions.

A further object of the present invention is to provide a system and method for notifying network servers of changes to feature information for a particular user or device.

In order to fulfill these and other objects, the present invention provides an extension to the SIP protocol that would be used for notifying network servers of changes to feature information for a particular user or device. This extension, which consists of an extra field header called "Feature", would allow an end client to inform the network server of feature changes, rather than perform these features itself.

BRIEF DESCRIPTION OF THE DRAWINGS

The above and other objects, features and advantages of the present invention will become more apparent from the following detailed description when taken in conjunction with the accompanying drawing in which.

DETAILED DESCRIPTION OF THE PREFERRED EMBODIMENTS

Figure 1:
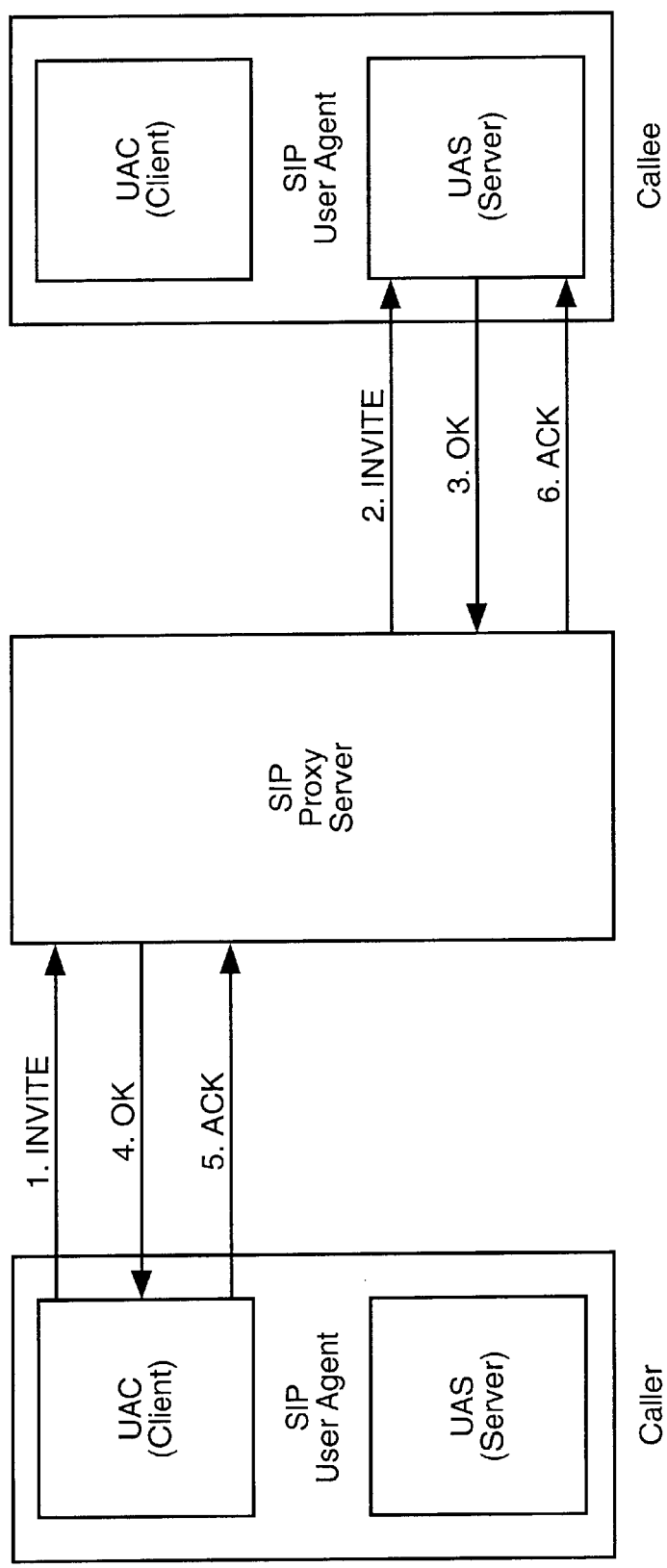
FIG. 1 shows the components of a SIP-based system and an overview of initiating a session.

In a traditional PBX system, when the end-user wanted to modify or begin use of a feature, such as DND, the telephone unit would send a message with special digits that indicated the feature control information. For instance, the DND button might send a "*720" message, which tells the PBX to activate the DND feature on that phone extension. Releasing the DND button might send a "@720" message, which tells the PBX to deactivate the DND feature on that phone extension.

The preferred embodiment of the present invention uses one of the message types (REGISTER) that already exists in SIP to send this type of feature control information. In order to do so, the preferred embodiment adds another field header to the REGISTER message, the "Feature" field header.

In order to more fully understand the preferred embodiment, a brief discussion of the various types of method messages in SIP is in order. INVITE and ACK are two method messages that were mentioned above; other method messages include OPTIONS, BYE, CANCEL, and REGISTER. The INVITE message indicates that the user or service is being invited to participate in a session. The ACK message confirms that the client has received a final response to an INVITE message. The OPTIONS message is a query to the server concerning the server's capabilities. The BYE message is used by the client to indicate to the server that it wishes to release or end the call. The CANCEL message is used to cancel a pending request.

The REGISTER message can be understood as a "log on" message, although it has many more uses. As an example, a desktop telephone could be designed with an "I'm here" button for indicating to the SIP server that the person is actually at that phone and ready to receive phone calls and other multimedia communications. This "I'm here" button would send a REGISTER message to the SIP server. That may or may not be followed up with a request for validation from the SIP server to insure privacy. If it all works out, the SIP server will register that user and the user's address in the SIP server database, so that calls can be properly routed.

In general, registration either validates or invalidates a SIP user agent for user services provided by the SIP server. Additionally, the user agent provides one or more contact locations to the SIP server. An example of a REGISTER message, in which a user named "Barney" is using to log on to a SIP server, is below:

```
REGISTER sip:ss2.wcom SIP 2.0
Via:  SIP/2.0/UDP there.com:5060
From: Barney <sip:UserB@there.com>
To:   Barney <sip:UserB@there.com>
Call-ID: 123456789@there.com
CSeq: 1 REGISTER
Contact: Barney <sip:UserB@there.com>
Contact: sip:+1-972-555-2222@gwl.wcom.com;user=phone
Contact: tel: +1-972-555-2222
Authorization:Digest username="UserB", realm="MCI WorldCom SIP",
 nonce="ea9c8e88df84flcec4341ae6cbe5a359", opaque="",
 uri="sip:ss2.wcom.com",
 response="dfe56131d1958046689cd83306477ecc"
Content-Length: 0
```

An exact description of the header fields is contained in RFC 2543, but such detail is unnecessary for complete understanding of the present invention. However, as an aside, the Authorization field header is used to validate that an authorized user is making the registration.

Figure 2:
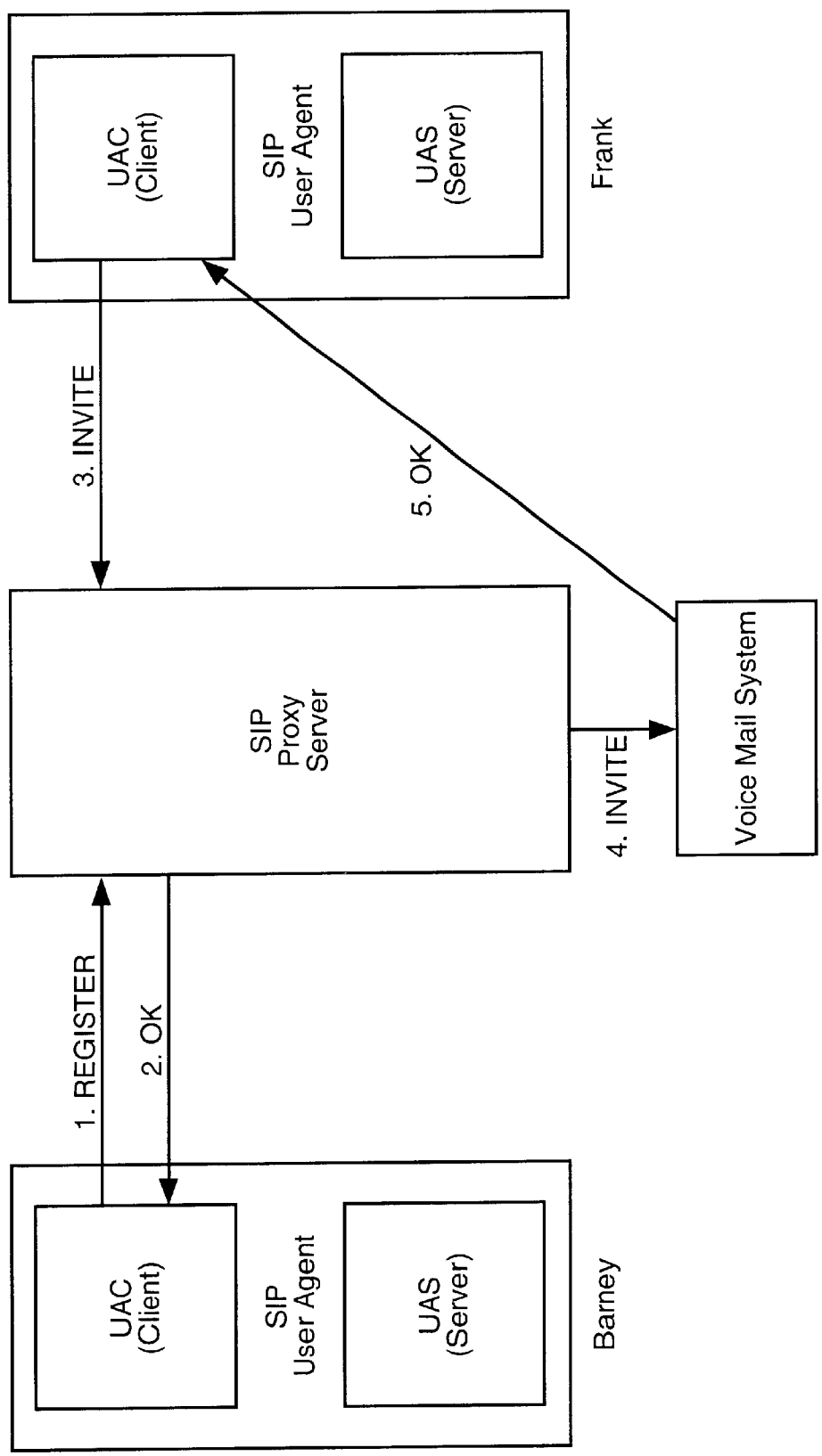
FIG. 2 shows a use of the REGISTER message according to an embodiment of the present invention.

In a preferred embodiment of the present invention, another field header is added to the REGISTER message that would carry feature control information. This would allow the REGISTER message to perform the additional functions required to emulate a traditional PBX system. For example, if the user in a IP-based PBX system pressed the DND button, a properly formatted REGISTER message is sent from the end client device, i.e. telephone, to the SIP Proxy Server, as shown by (1) in FIG. 2. The REGISTER message would have the following format (bold added to show new header):

```
REGISTER sip:ss2.wcom SIP 2.0
Via:  SIP/2.0/UDP there.com:5060
From: Barney <sip:UserB@there.com>
To:   Barney <sip:UserB@there.com>
Call-ID: 123456789@there.com
CSeq: 1 REGISTER
Contact: Barney <sip:UserB@there.com>
Contact: sip:+1-972-555-2222@gwl.wcom.com;user=phone
Contact: tel: +1-972-555-2222
Authorization:Digest username="UserB", realm="MCI WorldCom SIP",
 nonce="ea9c8e88df84flcec4341ae6cbe5a359", opaque="",
 uri="sip:ss2.wcom.com",
 response="dfe56131d1958046689cd83306477ecc"
Feature=dnd; status=active
Content-Length: 0
```

This Feature field entry would tell the SIP server to change the "dnd" feature status to "active". Thus, the SIP server would know to send all incoming calls for Barney to Barney's voice mail box. This allows the user agent client UAC to be "thin": in other words, the user agent client will not have to add all the PBX features to its own protocol. Instead, the user agent client (in our example, an IP-based desktop telephone) will simply tell the network server to provide the feature. When the SIP server has appropriately updated its tables and database, the SIP server sends (2) an OK message to the user agent client UAC to confirm that the feature status information has been updated. The OK message would have the following format (bold added to show new header):

```
            SIP 2.0 200 OK
Via:   SIP/2.0/UDP there.com:5060
From:  Barney <sip:UserB@there.com>
To:    Barney <sip:UserB@there.com>
Call-ID:  123456789@there.com
CSeq:  1 REGISTER
Contact: Barney <sip:UserB@there.com>
Contact: sip:+1-972-555-2222@gwl.wcom.com;user=phone
Contact: tel:  +1-972-555-2222
Feature=dnd; status=active
Content-Length:  0
```

When (3) someone attempts to call Barney, such as Frank, who happens to be using a SIP-enabled client device, the SIP server will refer to its updated tables and database and find that Barney wishes his messages to be entered into the voice mail system. The SIP server will then (4) redirect the incoming call to the voice mail messaging system. Then the (5) voice mail system will send an OK message to Frank in order to initiate a connection.

When using features such as call forwarding, screening or blocking, the Feature field entry would contain additional information. For instance, if the activated feature was call screening, the Feature field entry could appear as:

Feature=screen; status=active; tel: +1-972-555-1212

The REGISTER message containing this Feature field entry would instruct the SIP server to activate call screening and prevent the telephone number 1-972-555-1212 from calling the user. Clearly, other features may require more or less information, depending on the function that the SIP server will be required to perform.

The solution provided by the preferred embodiment is both easier to implement than traditional message handling, such as performed in a PBX system, and easier to understand. Furthermore, it's more intuitively obvious what "dnd; status=active" means than the traditional "*720".

While the present invention has been described in detail with reference to the preferred embodiment, it is a mere exemplary application. Thus, it is to be clearly understood that many variations can be made by anyone skilled in the art within the scope and spirit of the present invention.

What is claimed is:

1. A system for providing at least one PBX type service in a Session Initiation Protocol (SIP) based network, comprising:
at least one user agent client configured to insert a feature field header into at least one SIP formatted message; and
at least one SIP server coupled to the at least one user agent client, the SIP server being programmed to process the at least one SIP formatted message, the feature field header including a feature status portion configured to program the at least one SIP server to thereby activate or deactivate the at least one PBX type service.

2. The system as recited in claim 1, wherein the at least one user agent client enables a user to initiate a session, send and receive requests from the at least one server, the at least one server receiving a request, determining where to send the request, and forwarding the request, said at least one SIP formatted message containing said feature status information sent between the at least one user agent client and the at least one server.

3. The system as recited in claim 1, wherein the at least one user agent client enables a user to initiate a session, send and receive requests from the at least one server, the at least one server receiving a request, determining where to send the request, and informing said at least one user agent client where to send the request, said at least one SIP formatted message containing said feature status information sent between the at least one user agent client and the at least one server.

4. The system as recited in claim 1, wherein the at least one SIP server is configured to provide features, and receive the at least one SIP formatted message with feature status information, the at least one SIP server implementing the features according to the feature status information contained in the received at least one SIP formatted message.

5. The system as recited in claim 1, wherein said additional field header containing said feature status information is added to a REGISTER message.

6. The system as recited in claim 1, wherein said SIP based network initiates telephony sessions.

7. The system as recited in claim 6, wherein a feature corresponding to the feature status information is call forwarding.

8. The system as recited in claim 6, wherein a feature corresponding to the feature status information is call blocking.

9. The system as recited in claim 6, wherein a feature corresponding to the feature status information is call screening.

10. A method for providing feature status information in a Session Initiation Protocol (SIP) based network, said network having at least one user agent client (UAC) which is implemented in an end client device used by a user, at least one SIP server for implementing features, and messages including at least one field header, comprising the steps of:
adding feature status information to a message from the UAC to the SIP server;
transmitting said message to the SIP server;
implementing said features according to the feature status information in said message;
indicating to the end client device what feature status changes the user wishes to make; and
creating feature status information from said indication.

11. The method as recited in claim 10, wherein said feature status information has a feature status field header.

12. The method as recited in claim 10, wherein said message with added feature status information is a REGISTER message.

13. The method as recited in claim 10, wherein said SIP based network initiates telephony sessions.

14. The method as recited in claim 10, wherein a feature corresponding to the feature status information is call forwarding.

15. The method as recited in claim 10, wherein a feature corresponding to the feature status information is call blocking.

16. The method as recited in claim 10, wherein a feature corresponding to the feature status information is call screening.

17. A system for providing feature status information in a Session Initiation Protocol (SIP) based network, said network having method messages including at least INVITE, ACK, OPTIONS, BYE, CANCEL, REGISTER, each said method message having at least one field header, comprising:

at least one user agent client for using an additional field header to add feature status information to a REGISTER message, said user agent client sending said REGISTER message to at least one SIP server;

said at least one SIP server for receiving said REGISTER message from said at least one user agent client and for implementing features according to the feature status information in said REGISTER message; and at least one said network for transmitting messages between said at least one user agent client and said at least one SIP server.

18. The system as recited in claim 17, wherein said network initiates telephony sessions.

19. The system as recited in claim 18, wherein said features include one of call forwarding, call screening, and call blocking.

\* \* \* \* \*